United States Patent
Yu et al.

(10) Patent No.: US 11,909,168 B2
(45) Date of Patent: Feb. 20, 2024

(54) SELF-ADAPTIVE WAVE BAND AMPLIFICATION METHOD AND AMPLIFIER

(71) Applicant: Accelink Technologies Co., Ltd., Wuhan (CN)

(72) Inventors: Zhenyu Yu, Wuhan (CN); Qinlian Bu, Wuhan (CN); Chengpeng Fu, Wuhan (CN); Xiao Cai, Wuhan (CN); Fuxing Deng, Wuhan (CN); Rui Lei, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 1061 days.

(21) Appl. No.: 16/624,557

(22) PCT Filed: Dec. 25, 2017

(86) PCT No.: PCT/CN2017/118165
§ 371 (c)(1),
(2) Date: Aug. 24, 2020

(87) PCT Pub. No.: WO2018/233260
PCT Pub. Date: Dec. 27, 2018

(65) Prior Publication Data
US 2021/0021096 A1      Jan. 21, 2021

(30) Foreign Application Priority Data
Jun. 22, 2017 (CN) .................. 201710480699.X (51) Int. Cl.
*H01S 3/30* (2006.01)
*H01S 3/10* (2006.01)
(Continued)

(52) U.S. Cl.
CPC ............ *H01S 3/30* (2013.01); *H01S 3/08013* (2013.01); *H01S 3/10015* (2013.01);
(Continued)

(58) Field of Classification Search
None
See application file for complete search history.

(56) References Cited

U.S. PATENT DOCUMENTS

| 6,310,716 B1 | 10/2001 | Evans et al. |
| 6,606,337 B1 | 8/2003 | King |
| 2020/0220316 A1* | 7/2020 | Yu .................. H01S 3/06766 |

FOREIGN PATENT DOCUMENTS

| CN | 1384567 A | 12/2002 |
| CN | 105896306 A | 8/2016 |

(Continued)

OTHER PUBLICATIONS

International Search Report for PCT/CN2017/11165 dated Mar. 14, 2018.

*Primary Examiner* — Eric L Bolda
(74) *Attorney, Agent, or Firm* — Lei Fang, Esq.; Smith Tempel Blaha LLC (57) ABSTRACT

The present invention relates to the technical field of optical communications, and relates to an optical amplification method and an amplifier, and in particular, to a self-adaptive wave band amplification method and an amplifier. The present invention consists of a master amplifying unit and a slave amplifying unit, and can autonomously detect the service signal wave band range of an optical transmission line, and according to the detection result, the two amplifying units do not need to perform scheduling or configuration from the level of network management, and perform direct interaction and action from the bottom layer to implement self-adaptive on, off and adjustment in real time. On one hand, power consumption is reduced, and energy is
(Continued)

saved; and on the other hand, the performance is optimized, and an optimal optical amplification index is obtained.

8 Claims, 5 Drawing Sheets

(51) Int. Cl.
*H01S 3/067* (2006.01)
*H01S 3/08* (2023.01)
*H04B 10/25* (2013.01)

(52) U.S. Cl.
CPC ............ *H04B 10/25* (2013.01); *H01S 3/0677* (2013.01); *H01S 3/06766* (2013.01)

(56) References Cited

FOREIGN PATENT DOCUMENTS

| | | |
|---|---|---|
| CN | 107124224 A | 9/2017 |
| EP | 1091509 A2 | 4/2001 |

\* cited by examiner

SELF-ADAPTIVE WAVE BAND AMPLIFICATION METHOD AND AMPLIFIER

TECHNICAL FIELD

The present disclosure relates to an optical amplification method and an amplifier in a technical field of optical communication, and in particular to a self-adaptive wave band amplification method and an amplifier.

BACKGROUND

With higher and higher requirements in optical communication industry in aspects of transmission bandwidth and optical signal-to-noise ratio, a traditional C band erbium-doped fiber amplifier gradually appears to be more and more limited in regard to a noise figure and amplifying bandwidth.

A C+L band Raman or Hybrid amplifier is widely sought after for combining two excellent characteristics of low noise figure and wide band amplification into a whole. However, what is currently used is basically a traditional C band Raman/Hybrid optical amplifier, which cannot be smoothly replaced and upgraded to the C+L band Raman optical amplifier, the cost of replacement and upgrade being high. Although a few of C+L band Raman/Hybrid optical amplifiers have been configured, they are not self-adaptive or extensible, and therefore a manual judgment at a level of network management is required on whether a signal band is C/L/C+L, and ON/OFF of each Raman pump unit is configured manually. Such control manner is primitive and extensive, and configuration efficiency is too low.

SUMMARY

The present disclosure aims at the above existing technical problems, and provides a self-adaptive wave band amplification method and an amplifier. Through the amplification method and amplifier, the traditional C band Raman/Hybrid is modified, extended and upgraded to the C/C+L band Raman/Hybrid, and Raman/Hybrid amplification wave band may be intelligently and adaptively turned on, turned off and adjusted. In addition, the self-adaptation and extensibility provided in the present disclosure is to perform direct detections, interactions and actions from bottom layers of function units, and therefore, the response speed is high and the resource cost is low.

The above-mentioned technical problems presented in the present disclosure are primarily solved by the following technical solutions.

A self-adaptive wave band amplification method comprises:

a light splitting step for detecting C band detection light and L band detection light in an in-band signal; and a scheduling module for enabling a slave Raman amplifying unit to participate in amplification after the L band detection light is detected.

For example, in the above self-adaptive wave band amplification method, the scheduling module enables a master Raman amplifying unit after the C band detection light and/or the L band detection light is detected.

For example, the above self-adaptive wave band amplification method further comprises a wave combining step for performing wave combination/splitting by using two optical wavelength division multiplexers (OWDMs) after the slave Raman unit injects its pumping light into the master Raman unit, the wave combination comprising:

injecting pump light from the master Raman amplifying unit into a transmission fiber after wave combining/splitting once, and injecting pump light from the slave Raman unit into the transmission fiber after wave combining/splitting twice; or injecting the pump light from the slave Raman unit into the transmission fiber after wave combining/splitting once, and injecting the pump light from the master Raman unit into the transmission fiber after wave combining/splitting twice; or performing a first wave combination for the pump light from the master and slave Raman units and then a second wave combination with signal light.

For example, in the above self-adaptive wave band amplification method, a work flow of a Raman amplifying unit includes following steps:

step 4.1, determining whether a pump-starting condition is met, and executing step 4.2 if yes;

step 4.2, turning on a Raman unit pump with a preset small optical power value; returning to step 4.1 when it is determined that the pump-starting condition is not met, or executing step 4.3 when it is determined that a reflection coefficient does not exceed a threshold;

step 4.3, configuring pump power according to a comparison between light power of each band in signal light and a corresponding threshold, and returning to step 4.1 when it is determined that the pump-starting condition is not met, and executing step 4.2 when it is determined that the reflection coefficient exceeds the threshold.

For example, in the above adaptive wave band amplification method, in the step 4.3, selecting different working modes for the master Raman unit pump according to the comparison; and increasing pump optical power of the slave Raman unit to a target value according to the comparison.

A self-adaptive band amplifier, comprises:

a light splitting module for detecting C band detection light and L band detection light in an in-band signal;

a scheduling module for enabling a slave Raman amplifying unit to participate in amplification after the L band detection light is detected.

For example, in the above self-adaptive band amplifier, the light splitting module comprises: a first signal light splitter for splitting the in-band signal, and a first optical wavelength division multiplexer connected with the first signal light splitter, output ends of the first signal light splitter being respectively connected with a first photodetector and a second signal light splitter for a master Raman amplifying unit, and the second signal light splitter being connected with a first photodetector for the slave Raman amplifying unit.

For example, in the above self-adaptive band amplifier, pump light emitted from a slave Raman amplifying unit pump is injected into the master Raman amplifying unit, passes through a first pump light splitter and is combined with the in-band signal light at a second optical wavelength division multiplexer, and then is combined at the first optical wavelength division multiplexer with pump light emitted from a master Raman amplifying unit pump split by a second pump light splitter.

For example, in the above self-adaptive band amplifier, pump light emitted from the master Raman amplifying unit pump passes through a second pump light splitter and is combined with the in-band signal light at the first optical wavelength division multiplexer, and then is combined at a second optical wavelength division multiplexer with pump light from the slave Raman amplifying unit processed by the first pump light splitter.

For example, in the above self-adaptive band amplifier, pump light emitted from the master Raman amplifying unit pump and pump light emitted from the slave Raman amplifying unit pump are split respectively by the first pump light splitter and the second pump light splitter and combined at the optical wavelength division multiplexer, and then combined with the in-band signal light by another optical wavelength division multiplexer.

Therefore, the present disclosure has the following advantages: (1) the present self-adaptive wave band amplifier is composed of two portions of the master amplifying unit and the slave amplifying unit, and may independently detect the service signal band range of an optical transmission line; (2) the two amplifying units need not be scheduled and configured from the level of network management, but directly interact and act from the bottom layers to be turned on, turned off and adjusted self-adaptively in real time; (3) it not only may reduce power consumption and save energy, but also may optimize the performance and obtain an optimal optical amplification index.

BRIEF DESCRIPTION OF THE DRAWINGS

In FIGS. 1, 2, and 3, thick arrows indicate a propagation direction of a Raman pump light, and thin arrows indicate a propagation direction of signal light as signal detection light.

DETAILED DESCRIPTION OF EMBODIMENTS

The technical solutions of the present disclosure are further described below with reference to the embodiments and the drawings.

Embodiments

Through C/L WDM, a master Raman amplifying unit separates signal light into C band signal light and L band signal light. The two bands of signal light are respectively detected, and the L band signal light is introduced to a slave Raman amplifying unit. When only the C band signal light exists, only the master Raman amplifying unit actively participates in amplification. And once the L band signal light is added, it will surely be captured by the master Raman amplifying unit and the slave Raman amplifying unit, and triggers the two Raman amplifying units to act correspondingly. The master Raman amplifying unit will adjust its own working states, meanwhile, the slave Raman amplifying unit will turn on and participate in amplification. Once the L band signal is lost, the slave Raman amplifying unit will automatically turn off. On the other hand, when a C band service signal and a L band service signal both are lost, the master Raman unit will automatically turn off, and the master Raman unit is automatically turned on and enabled as long as the service signal is recovered. For the master Raman unit, when the C band signal and the L band signal both exist, only the C band signal exists or only the L band signal exists, the master Raman unit is turned on, and respectively works in three configuration manners. When only the L band signal exists and the C band signal and L band signal both exist, the slave Raman unit is enabled.

After the slave Raman unit injects its pump light into the master Raman unit, a wave combination/splitting will be performed by using two optical wavelength division multiplexers in three manners.

Figure 1:
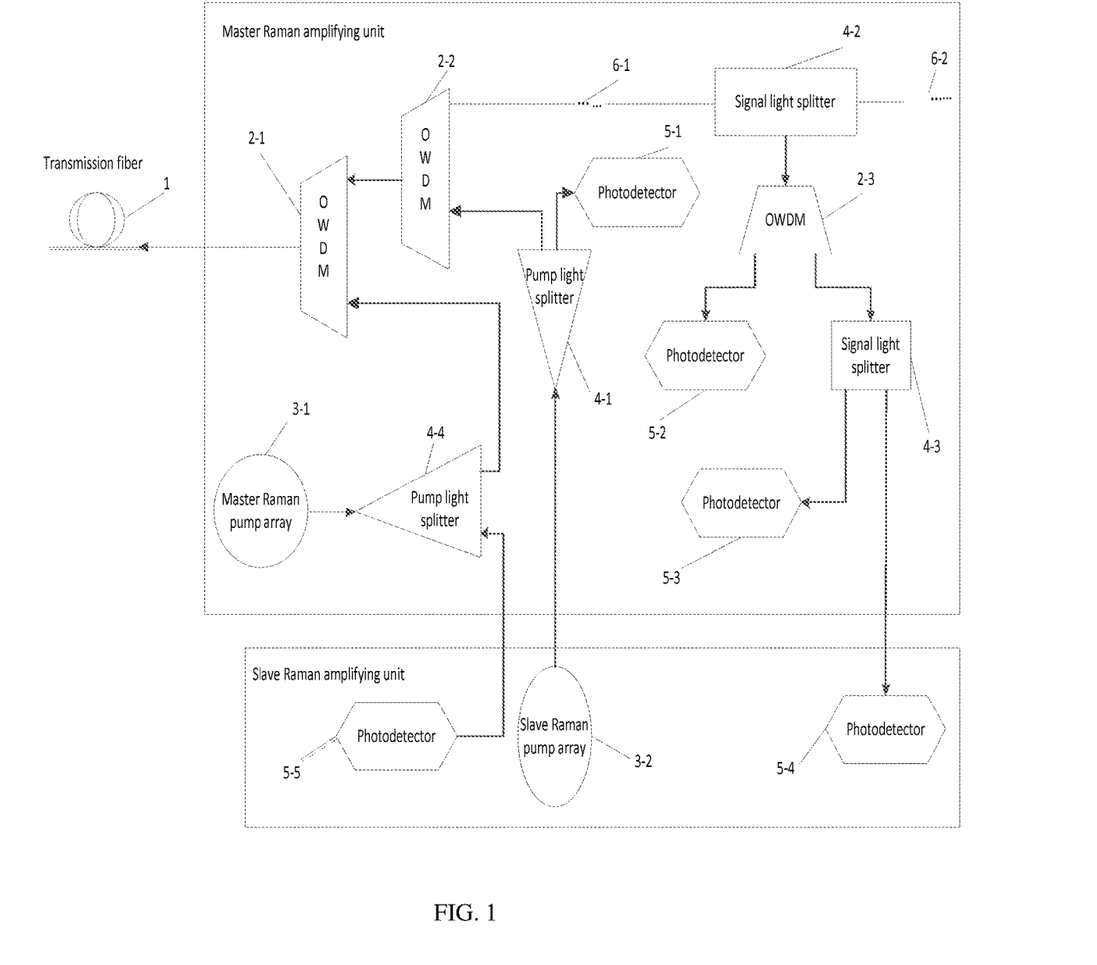
FIG. 1 shows an architectural form 1 of a C+L Raman optical amplifier.

The first manner is that pump light from the master Raman unit is combined/split once and then injected into a transmission fiber, while pump light from the slave Raman unit needs to be combined/split twice and then injected into the transmission fiber, as shown in FIG. 1. In FIG. 1, the pump light emitted from a Raman amplifying unit pump 3-2 is injected into the master Raman amplifying unit, passes through a first pump light splitter 4-1 and is split a small amount into a first photodetector 5-1, while the light on the main path passes through a second optical wavelength division multiplexer 2-2 and is combined with in-band signal light. Then, the pump light from the slave Raman amplifying unit pump 3-2 and the pump light from the master Raman amplifying unit pump 3-1 is combined by the first wavelength division multiplexer 2-1 and then is injected into a transmission fiber 1 together. The master Raman amplifying unit pump 3-1 is split via the first pump light splitter 4-1, and a small amount of the pump light enters a fifth photodetector 5-5 for the slave Raman amplifying unit, while most amount of the pump light enters a first optical wavelength division multiplexer 2-1.

The in-band signal light is split via a second signal light splitter 4-2, and a small amount of the in-band signal light enters a third optical wavelength division multiplexer 2-3 and then is divided into C band and L band for detection respectively. The C band monitoring light enters a second photodetector 5-2, and the L band monitoring light then enters a third signal light splitter 4-3 and is split into two beams of light, one of which enters a third photodetector 5-3, and the other of which enters a fourth photodetector 5-4 for the slave Raman amplifying unit.

Figure 2:
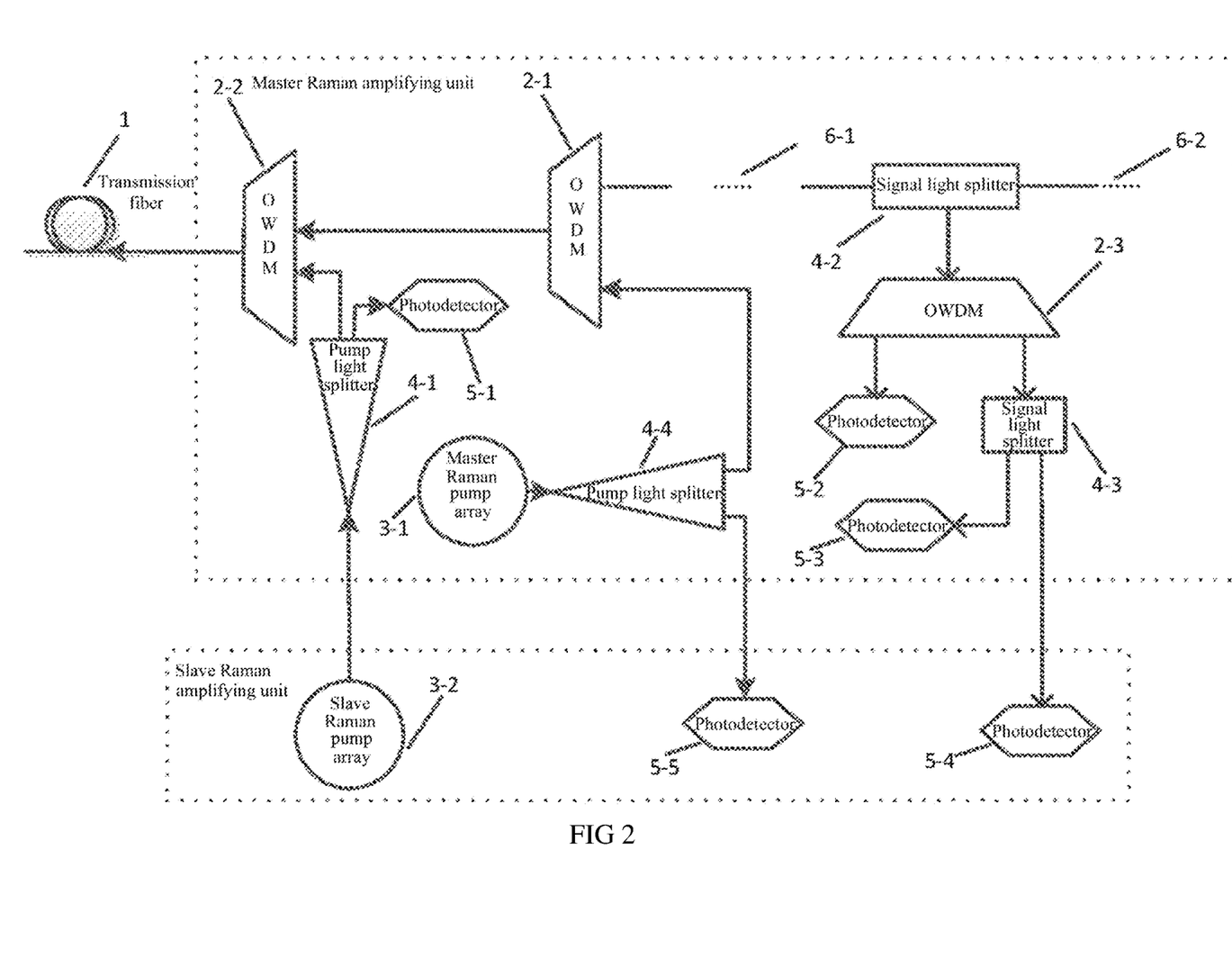
FIG. 2 shows an architectural form 2 of a C+L Raman optical amplifier.

The second manner is that the pump light from the slave Raman unit is combined/split once and then injected into the transmission fiber, while the pump light from the master Raman unit needs to be combined/split twice and then injected into the transmission fiber, as shown in FIG. 2. The difference between FIG. 2 and FIG. 1 is that in FIG. 2 the pump light from the master Raman amplifying unit pump 3-1 is combined twice by the first wavelength division multiplexer 2-1 and the second wavelength division multiplexer 2-2, while the pump light from the slave Raman amplifying unit pump 3-2 is combined by the second wavelength division multiplexer 2-2 only once and then reaches the transmission fiber 1.

Figure 3:
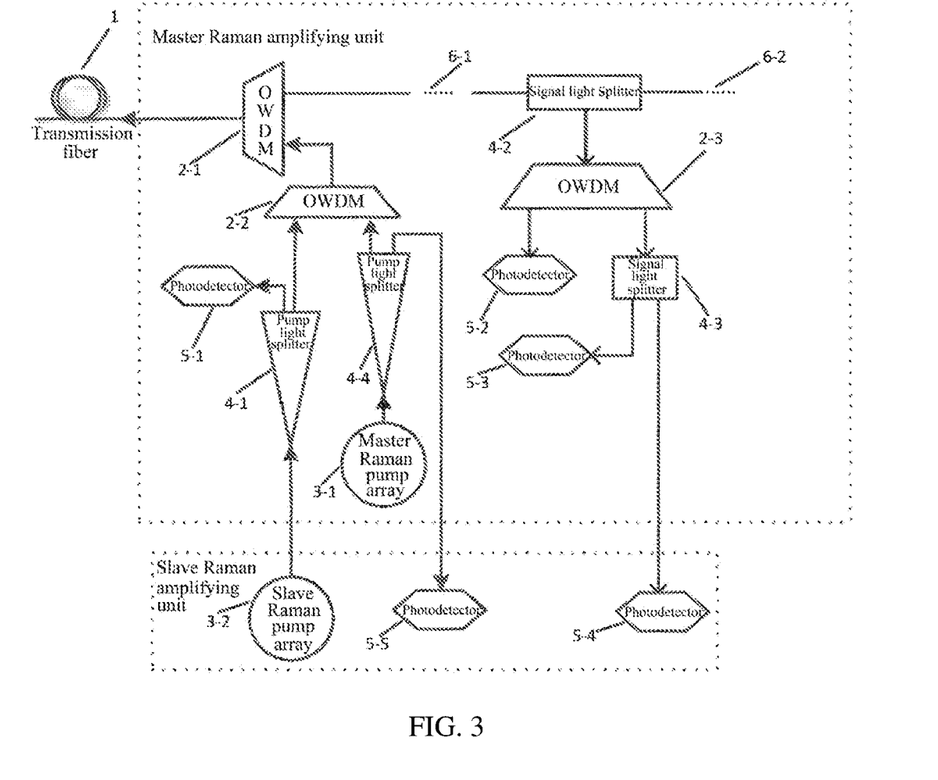
FIG. 3 shows an architectural form 3 of a C+L Raman optical amplifier.

The third manner is that the pump light from the master Raman unit and the pump light from the slave Raman unit is performed a first combination, and then a second combination with the signal light, as shown in FIG. 3. The difference between FIG. 3 and FIG. 1 is that in FIG. 3 the pump light from the master Raman unit pump 3-1 and the pump light from the slave Raman unit pump 3-2 is combined by the second wavelength division multiplexer 2-2, and then is combined with the signal light by the first wavelength division multiplexer 2-1, finally reaches the transmission fiber 1.

In the above first manner, i.e. in FIG. 1, the master Raman pump that amplifies the C band signal is combined/split only once and then enters the transmission fiber, while the slave Raman pump that amplifies the L band signal is combined/ split twice and then enters the transmission fiber. In other words, in the first manner, the attenuation experienced by the master Raman pump is relatively low, while the attenuation experienced by the slave Raman pump is relatively large, that is to say, the first manner is more beneficial to the C band signal amplification. In the second manner, i.e. in the FIG. 2, the master Raman pump that amplifies the C band signal is performed wave combination and wave split twice and then enters the transmission fiber, while the slave Raman pump that amplifies the L band signal is performed the wave combination and wave split only once and then enters the transmission fiber. In other words, in the second manner, the attenuation experienced by the master Raman pump is relatively large, while the attenuation experienced by the slave Raman pump is relatively small, that is to say, the second manner is more beneficial to the L band signal amplification. In the third manner, both the master Raman pump and the slave Raman pump are performed the wave combination and wave split twice before entering the transmission fiber, and the attenuation experienced by both are relatively large, however, the signal light from the transmission fiber to output from the Raman optical amplifier is combined/split only once, i.e. the relative attenuation of the signal light is relatively small.

In summary, if the emphasis is placed on the optical amplification of the C band signal light, the first manner is preferable to be adopted, and if the emphasis is placed on the optical amplification of the L band signal light, the second manner is preferable to be adopted, and if the C band and L band are in the same position, the third manner is preferable to be adopted.

In addition, the working states of the pumps of the master Raman unit and the slave Raman unit are mutually monitored each other by detecting the C/L signal in-band optical power and detecting their pump optical power. Their work flows may be seen in FIG. 4 and FIG. 5.

The propagation direction of the pump light and the propagation direction of the signal light may be either the same direction or the opposite direction.

Figure 4:
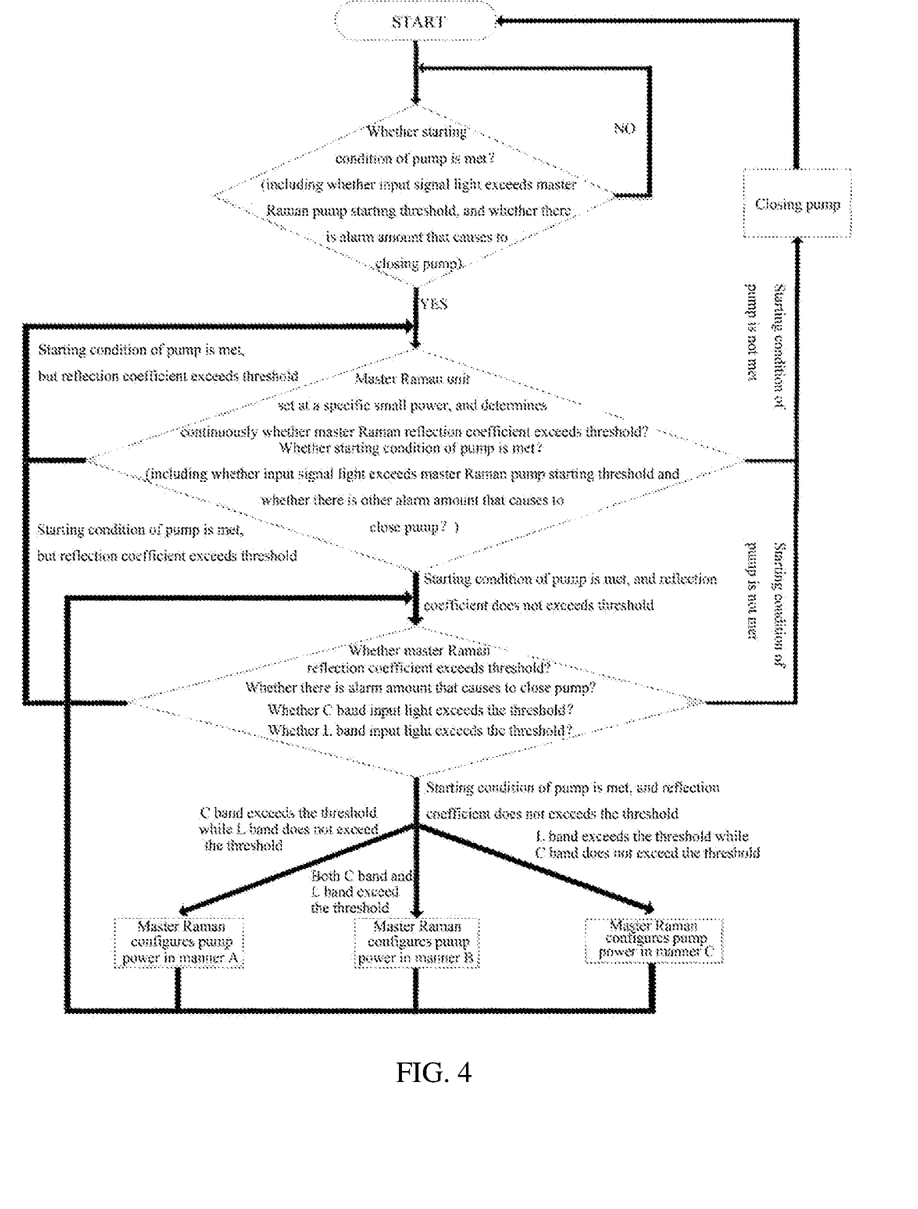
FIG. 4 is a working flowchart of a master Raman unit.

FIG. 4 is a working flowchart of the master Raman unit.

After powered on, the master Raman unit determines whether the pump-starting condition is met, wherein the pump-starting condition includes whether the input signal light exceeds a corresponding threshold, and whether alarm elements that restrain to start the pump exist. If the pump-starting condition is not met, this step is repeated. Once the condition is met, the next step is proceeded to. The purport of this step is to avoid that the pump is started at an inappropriate time. In fact, the pump-closing priority is always highest, and determining whether the pump is to be closed will run through the entire work flow. Once the pump-closing condition is triggered, the pump-closing instruction is immediately issued and the pump is closed.

After the pump-starting condition is met, the master Raman unit sets the pump optical power at a specific small optical power value, such as 50 mW, and determines whether a reflection coefficient exceeds a threshold, if the threshold is exceeded, the low power mode is remained, otherwise, the next step is proceeded to. The purport of this step is to avoid excessive reflected light power caused by compelling to increase the pump power without a qualified reflection coefficient. Meanwhile, as mentioned above, in this step, it is also always determined whether the pump-starting/pump-closing condition is satisfied. Once the pump needs to be closed, the closing instruction of pump is immediately issued, and thus the beginning of the work flow is returned.

As above mentioned, in the condition that the reflection coefficient does not exceed the threshold and the pump-starting condition is met, the next step is proceeded to. In this step, it is determined that whether light power of the C band signal in the signal light exceeds a threshold, whether light power of the L band signal in the signal light exceeds the threshold, or whether both light power of the C band signal and light power of the L band signal exceed the threshold? The purpose of this step is to determine by what working parameter the master Raman pump unit works in the next step. Meanwhile, in this step, it is also always determined whether the pump-starting/pump-closing condition is met and whether the reflection coefficient exceeds the threshold? If the pump-starting condition is met and the reflection coefficient is abnormal, then the low power mode is returned to; if the pump-starting condition is not met, the pump will be closed directly and the beginning of the work flow is returned to. If the reflection coefficient is normal and the pump-starting condition is met, then the next step is proceeded to.

When the light power of the C band signal exceeds the threshold and the light power of the L band signal is below the threshold, the pump power is configured in a manner A; when both the light power of the C and L band signals exceeds the threshold, the master Raman unit configures the pump optical power in a manner B; when the light power of the C band signal is below the threshold and the light power of the L band signal is above the threshold, the pump optical power is configured in a manner C.

The manner A is that the pump power is configured to enable the C band signal gain to reach a target gain (gain mode) or enable the C band Raman pump light to reach a target value (power mode) when only the C band signal exists.

The manner B is that the pump optical power is configured to enable the C+L band signal gain to reach the target gain (gain mode) or enable the C band Raman pump light to reach the target value (power mode) when the C band signal and the L band signal both exist.

The manner C is that the pump optical power is configured to enable the L band signal gain to reach the target gain (gain mode) or enable the C band Raman pump light to reach the target value (power mode) when only the L band signal exists.

Figure 5:
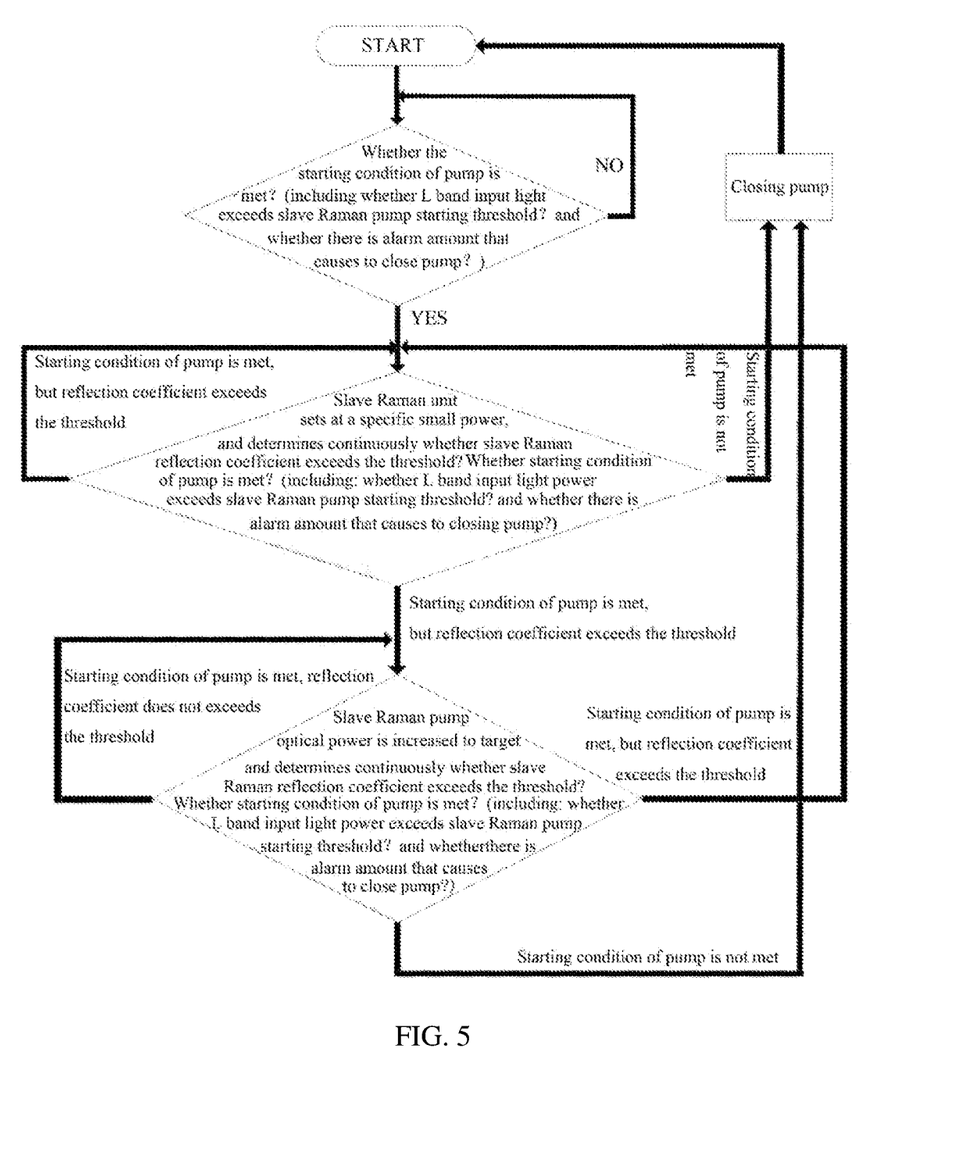
FIG. 5 is a working flowchart of a slave Raman unit.

FIG. 5 is a working flowchart of the slave Raman unit.

The difference from the work flow of the master Raman unit is that the slave Raman unit only needs to detect the light power of the L band signal without considering whether the light power of the C band signal exceeds the threshold.

After powered on, the slave Raman unit determines whether the pump-starting condition is met, wherein the pump-starting condition includes whether the L band input signal light exceeds the threshold, and whether alarm elements that restrain to start the pump exist. If the pump-starting condition is not met, this step is repeated. Once the condition is met, the next step is proceeded to. The purport of this step is to avoid to start the pump at an inappropriate time. In fact, the pump-closing priority is always highest, and determining whether to close the pump will run through the entire work flow. Once the closing condition of pump is triggered, the closing instruction of pump is immediately issued and the pump is closed.

After the pump-starting condition is met, the slave Raman unit sets the pump optical power at a specific small optical power value, such as 50 mW, and determines whether the reflection coefficient exceeds the threshold. If the threshold is exceeded, the low power mode is remained, otherwise, the next step is proceeded to. The purport of this step is to avoid excessive reflected light power caused by compelling to increase the pump power without a qualified reflection coefficient. Meanwhile, as above mentioned, in this step, it is also always determining whether the pump-starting/pump-closing condition is met. Once the pump needs to be closed, the pump-closing instruction is immediately issued, and thus the beginning of the work flow is returned to.

As above mentioned, in the condition that the reflection coefficient does not exceed the threshold and the pump-starting condition is met, the next step is proceeded to, and the slave Raman pump optical power is increased to the target value, and the determination is performed continuously: if the pump-starting condition is met but the reflection coefficient is abnormal, then the low power mode is returned to; if the pump-starting condition is not met, the pump is closed directly and the beginning of the work flow is returned to.

The target value is either a setting value of the L band Raman pump output optical power (power mode) or a setting value of the signal gain (gain mode).

The specific embodiments described herein are merely illustration of the spirit of the present invention. Those skilled in the art to which the present invention belongs can make various modifications or supplements to the described specific embodiments or replace them in a similar mode without departing from the spirit of the present invention or exceeding the scope defined in the appended claims.

What is claimed is:

1. A self-adaptive wave band amplification method, characterized in comprising:
   a light splitting step for detecting C band detection light and L band detection light in an in-band signal; and
   a scheduling step for enabling a slave Raman amplifying unit to participate in amplification after the L band detection light is detected,
   wherein the method further comprises a wave combining step for performing a wave combination/splitting by using two optical wavelength division multiplexers after the slave Raman unit injects its pumping light into a master Raman unit, the wave combination comprising:
   injecting pump light from the master Raman amplifying unit into a transmission fiber after wave combining/splitting once, and injecting pump light from the slave Raman unit into the transmission fiber after wave combining/splitting twice; or
   injecting the pump light from the slave Raman unit into the transmission fiber after wave combining/splitting once, and injecting the pump light from the master Raman unit into the transmission fiber after wave combining/splitting twice; or
   performing a first wave combination for the pump light from the master and slave Raman units and then a second wave combination/split with signal light.

2. The self-adaptive wave band amplification method of claim 1, characterized in that the scheduling step enables a master Raman amplifying unit after the C band detection light and/or the L band detection light is detected.

3. The self-adaptive wave band amplification method of claim 1, characterized in that a work flow of a Raman amplifying unit includes following steps:
   step a, determining whether a pump-starting condition is met, and executing step b if yes;
   step b, turning on a Raman unit pump with a preset small optical power value; returning to step 4,1-a when it is determined that the pump-starting condition is not met or executing step c when it is determined that a reflection coefficient does not exceed a threshold;
   step c, configuring pump power according to a comparison between light power of each band in signal light and a corresponding threshold, and returning to step a when it is determined that the pump-starting condition is not met, and executing step b when it is determined that the reflection coefficient exceeds the threshold.

4. The self-adaptive wave band amplification method of claim 3, characterized in that in the step c,
   selecting different working modes for the master Raman unit pump according to the comparison; and
   increasing pump optical power of the slave Raman unit to a target value according to the comparison.

5. A self-adaptive band amplifier, characterized in comprising:
   a light splitting module for detecting C band detection light and L band detection light in an in-band signal; and
   a scheduling module for enabling a slave Raman amplifying unit to participate in amplification after the L band detection light is detected,
   wherein the light splitting module comprises: a first signal light splitter for splitting the in-band signal, and a first optical wavelength division multiplexer connected with the first signal light splitter, output ends of the first signal light splitter being respectively connected with a first photodetector and a second signal light splitter for a master Raman amplifying unit, and the second signal light splitter being connected with a first photodetector for the slave Raman amplifying unit.

6. The self-adaptive band amplifier of claim 5, characterized in that pump light emitted from a slave Raman amplifying unit pump is injected into a master Raman amplifying unit, passes through a first pump light splitter and is combined with in-band signal light at a second optical wavelength division multiplexer, and then is combined at a first optical wavelength division multiplexer with pump light emitted from a master Raman amplifying unit pump split by a second pump light splitter.

7. The self-adaptive band amplifier of claim 5, characterized in that pump light emitted from a master Raman amplifying unit pump passes through a second pump light splitter and is combined with an in-band signal light at a first optical wavelength division multiplexer, and then is combined at a second optical wavelength division multiplexer with pump light from a slave Raman amplifying unit processed by a first pump light splitter.

8. The self-adaptive band amplifier of claim 5, characterized in that pump light emitted from a master Raman amplifying unit pump and pump light emitted from a slave Raman amplifying unit pump are split respectively by a first pump light splitter and a second pump light splitter and combined at an optical wavelength division multiplexer, and then combined with an in-band signal light by another optical wavelength division multiplexer.

* * * * *